(12) United States Patent
Graf et al.

(10) Patent No.: US 9,405,120 B2
(45) Date of Patent: Aug. 2, 2016

(54) HEAD-UP DISPLAY AND VEHICLE USING THE SAME

(71) Applicant: MAGNA ELECTRONICS SOLUTIONS GMBH, Wetzlar (DE)

(72) Inventors: Stefan Graf, Taipei (TW); Matthias Doepp, Taipei (TW)

(73) Assignee: MAGNA ELECTRONICS SOLUTIONS GMBH, Wetzlar (DE)

( * ) Notice: Subject to any disclaimer, the term of this patent is extended or adjusted under 35 U.S.C. 154(b) by 0 days.

(21) Appl. No.: 14/548,281

(22) Filed: Nov. 19, 2014

(65) Prior Publication Data

US 2016/0139409 A1   May 19, 2016

(51) Int. Cl.
*G02B 27/14* (2006.01)
*G02B 27/01* (2006.01)

(52) U.S. Cl.
CPC ........ *G02B 27/0149* (2013.01); *G02B 27/0101* (2013.01); *G02B 2027/0154* (2013.01); *G02B 2027/0161* (2013.01)

(58) Field of Classification Search
USPC .................................. 359/630–639
See application file for complete search history.

(56) References Cited

U.S. PATENT DOCUMENTS

| 1,523,495 | A | 1/1925 | Silberman |
| 1,629,456 | A | 5/1927 | Pellegrini |
| 1,684,499 | A | 9/1928 | Mayer |
| 1,721,347 | A | 7/1929 | Macrae et al. |
| 2,117,160 | A | 5/1938 | Gale |
| 2,360,227 | A | 10/1944 | Hemphill |
| 2,688,865 | A | 9/1954 | Foster et al. |
| 2,760,050 | A | 8/1956 | Porsche |
| 3,016,968 | A | 1/1962 | Lenz et al. |
| 3,241,344 | A | 3/1966 | Peters |
| 3,553,448 | A | 1/1971 | Davis et al. |
| 3,582,639 | A | 6/1971 | Chamberlain |
| 3,596,484 | A | 8/1971 | Peters |
| 3,678,716 | A | 7/1972 | Cobb |
| 3,759,556 | A | 9/1973 | Wright |
| 3,766,539 | A | 10/1973 | Bradshaw et al. |
| 3,829,693 | A | 8/1974 | Schwarz |
| 3,839,640 | A | 10/1974 | Rossin |

(Continued)

FOREIGN PATENT DOCUMENTS

| DE | 2636099 | 2/1978 |
| DE | 3732936 | 9/1987 |

(Continued)

OTHER PUBLICATIONS

"Kit 62 Movement Detector Components", Sep. 24, 1994 p. 1-5.

(Continued)

*Primary Examiner* — Mohammed Hasan
(74) *Attorney, Agent, or Firm* — Gardner, Linn, Burkhart & Flory, LLP

(57) ABSTRACT

A head-up display (HUD) comprises a detection unit, a picture generating unit and a control unit. The detection unit detects a position of an object and generates a detection signal indicated the position of the object. The picture generating unit comprises a screen and an optical unit. The screen displays a visual image. The optical unit projects the visual image onto the screen. The control unit is coupled to the detection unit and the picture generating unit, controlling the screen to facing toward the object in response to the detection signal.

16 Claims, 5 Drawing Sheets

(56) References Cited

U.S. PATENT DOCUMENTS

| | | |
|---|---|---|
| 3,956,732 A | 5/1976 | Teich |
| 3,992,909 A | 11/1976 | McGhee |
| 4,007,955 A | 2/1977 | Kobayashi |
| 4,052,716 A | 10/1977 | Mortensen |
| 4,080,812 A | 3/1978 | Knott |
| 4,122,371 A | 10/1978 | Talmage et al. |
| 4,127,966 A | 12/1978 | Schmidt |
| 4,155,233 A | 5/1979 | Lira |
| 4,166,955 A | 9/1979 | Keller |
| 4,242,669 A | 12/1980 | Crick |
| 4,312,197 A | 1/1982 | Carrion et al. |
| 4,318,089 A | 3/1982 | Frankel et al. |
| 4,322,959 A | 4/1982 | Mochida |
| 4,342,210 A | 8/1982 | Denningham |
| 4,365,232 A | 12/1982 | Miller |
| 4,371,205 A | 2/1983 | Kaveney, Jr. |
| 4,379,971 A | 4/1983 | Smith et al. |
| 4,384,207 A | 5/1983 | Doctor |
| 4,418,335 A | 11/1983 | Genähr |
| 4,437,003 A | 3/1984 | Doctor |
| 4,441,023 A | 4/1984 | Doctor et al. |
| 4,464,649 A | 8/1984 | Her |
| 4,468,657 A | 8/1984 | Rossin |
| 4,482,179 A | 11/1984 | Johnson |
| 4,507,654 A | 3/1985 | Stolarczyk et al. |
| 4,546,417 A | 10/1985 | Watts |
| 4,556,796 A | 12/1985 | Renals |
| 4,604,524 A | 8/1986 | Kotlicki et al. |
| 4,612,442 A | 9/1986 | Toshimichi |
| 4,645,233 A | 2/1987 | Bruse et al. |
| 4,647,967 A * | 3/1987 | Kirschner ......... G02B 27/0101 340/980 |
| 4,667,990 A | 5/1987 | Quantz |
| 4,697,081 A | 9/1987 | Baker |
| 4,704,533 A | 11/1987 | Rose et al. |
| 4,709,153 A | 11/1987 | Schofield |
| 4,745,284 A | 5/1988 | Masuda et al. |
| 4,746,910 A | 5/1988 | Pfister et al. |
| 4,752,768 A | 6/1988 | Steers et al. |
| 4,764,755 A | 8/1988 | Pedtke et al. |
| 4,775,347 A | 10/1988 | Takada et al. |
| 4,796,013 A | 1/1989 | Yasuda et al. |
| 4,797,657 A | 1/1989 | Vorzimmer et al. |
| 4,825,079 A | 4/1989 | Takamatsu et al. |
| 4,848,114 A | 7/1989 | Rippe |
| 4,848,509 A | 7/1989 | Bruhnke et al. |
| 4,857,912 A | 8/1989 | Everett, Jr. et al. |
| 4,868,390 A | 9/1989 | Keller et al. |
| 4,881,148 A | 11/1989 | Lambropoulos et al. |
| 4,895,009 A | 1/1990 | Kleefeldt et al. |
| 4,928,212 A | 5/1990 | Benavides |
| 4,930,864 A | 6/1990 | Kuster et al. |
| 4,933,668 A | 6/1990 | Oyer et al. |
| 4,952,808 A | 8/1990 | Turnbull et al. |
| 4,954,813 A | 9/1990 | August, Sr. et al. |
| 4,979,384 A | 12/1990 | Malesko et al. |
| 4,981,314 A | 1/1991 | Carr |
| 4,982,094 A | 1/1991 | Matsuda |
| 5,003,800 A | 4/1991 | Bublewicz |
| 5,027,104 A | 6/1991 | Reid |
| 5,030,012 A | 7/1991 | Hagins et al. |
| 5,045,702 A | 9/1991 | Mulleer |
| 5,054,686 A | 10/1991 | Chuang |
| 5,054,826 A | 10/1991 | Dow et al. |
| 5,063,371 A | 11/1991 | Oyer et al. |
| 5,065,976 A | 11/1991 | Woody |
| 5,071,160 A | 12/1991 | White et al. |
| 5,077,549 A | 12/1991 | Hershkovitz et al. |
| 5,084,696 A | 1/1992 | Guscott et al. |
| 5,093,656 A | 3/1992 | Dipoala |
| 5,166,679 A | 11/1992 | Vranish et al. |
| 5,174,643 A | 12/1992 | Priesemuth |
| 5,216,407 A | 6/1993 | Hwang |
| 5,219,413 A | 6/1993 | Lineberger |
| 5,231,359 A | 7/1993 | Masuda et al. |
| 5,276,772 A | 1/1994 | Wang et al. |
| 5,283,551 A | 2/1994 | Guscott |
| 5,297,010 A | 3/1994 | Camarota et al. |
| 5,317,620 A | 5/1994 | Smith |
| 5,349,329 A | 9/1994 | Smith |
| 5,383,703 A | 1/1995 | Irvine, III |
| 5,404,128 A | 4/1995 | Ogino et al. |
| 5,406,171 A | 4/1995 | Moody |
| 5,409,273 A | 4/1995 | Claar et al. |
| 5,424,711 A | 6/1995 | Müller et al. |
| 5,424,712 A | 6/1995 | Rosenberger |
| 5,424,718 A | 6/1995 | Müller et al. |
| 5,445,326 A | 8/1995 | Ferro et al. |
| 5,457,493 A | 10/1995 | Leddy et al. |
| 5,457,575 A | 10/1995 | Groves et al. |
| 5,482,314 A | 1/1996 | Corrado et al. |
| 5,486,810 A | 1/1996 | Schwarz |
| 5,512,836 A | 4/1996 | Chen et al. |
| 5,525,843 A | 6/1996 | Höwing |
| 5,550,677 A | 8/1996 | Schofield et al. |
| 5,580,153 A | 12/1996 | Motz |
| 5,581,230 A | 12/1996 | Barrett |
| 5,585,625 A | 12/1996 | Spies |
| 5,636,536 A | 6/1997 | Kinnucan |
| 5,663,704 A | 9/1997 | Allen et al. |
| 5,670,935 A | 9/1997 | Schofield et al. |
| 5,677,701 A | 10/1997 | Okuyama et al. |
| 5,680,096 A | 10/1997 | Grasmann |
| 5,693,943 A | 12/1997 | Tchernihovski et al. |
| 5,711,559 A | 1/1998 | Davis |
| 5,719,551 A | 2/1998 | Flick |
| 5,724,024 A | 3/1998 | Sonderegger et al. |
| 5,726,629 A | 3/1998 | Yu |
| 5,737,083 A | 4/1998 | Owechko et al. |
| 5,793,291 A | 8/1998 | Thornton |
| 5,796,094 A | 8/1998 | Schofield et al. |
| 5,802,479 A | 9/1998 | Kithil et al. |
| 5,805,056 A | 9/1998 | Mueller et al. |
| 5,808,552 A | 9/1998 | Wiley et al. |
| 5,848,802 A | 12/1998 | Breed et al. |
| 5,859,479 A | 1/1999 | David |
| 5,877,897 A | 3/1999 | Schofield et al. |
| 5,887,466 A | 3/1999 | Yoshizawa |
| 5,914,610 A | 6/1999 | Gershenfeld et al. |
| 5,933,090 A | 8/1999 | Christenson |
| 5,938,321 A | 8/1999 | Bos et al. |
| 5,949,331 A | 9/1999 | Schofield et al. |
| 5,949,340 A | 9/1999 | Rossi |
| 5,986,549 A | 11/1999 | Teodorescu |
| 6,000,076 A | 12/1999 | Webster et al. |
| 6,018,292 A | 1/2000 | Penny, Jr. |
| 6,024,388 A | 2/2000 | Tomah et al. |
| 6,028,509 A | 2/2000 | Rice |
| 6,051,981 A | 4/2000 | Gershenfeld et al. |
| 6,067,019 A | 5/2000 | Scott |
| 6,086,131 A | 7/2000 | Bingle et al. |
| 6,091,322 A | 7/2000 | Ang et al. |
| 6,104,293 A | 8/2000 | Rossi |
| 6,130,614 A | 10/2000 | Miller et al. |
| 6,135,514 A | 10/2000 | Kowalewski et al. |
| 6,139,172 A | 10/2000 | Bos et al. |
| 6,166,625 A | 12/2000 | Teowee et al. |
| 6,209,933 B1 | 4/2001 | Ang et al. |
| 6,222,442 B1 | 4/2001 | Gager et al. |
| 6,226,816 B1 | 5/2001 | Webster et al. |
| 6,254,261 B1 | 7/2001 | Bingle et al. |
| 6,275,146 B1 | 8/2001 | Kithil et al. |
| 6,313,454 B1 | 11/2001 | Bos et al. |
| 6,320,176 B1 | 11/2001 | Schofield et al. |
| 6,335,687 B1 | 1/2002 | Terashima et al. |
| 6,339,376 B1 | 1/2002 | Okada |
| 6,349,984 B1 | 2/2002 | Marrazzo et al. |
| 6,353,392 B1 | 3/2002 | Schofield et al. |
| 6,356,854 B1 | 3/2002 | Schubert et al. |
| 6,390,529 B1 | 5/2002 | Bingle et al. |
| 6,396,397 B1 | 5/2002 | Bos et al. |
| 6,460,906 B2 | 10/2002 | Bingle et al. |
| 6,477,464 B2 | 11/2002 | McCarthy et al. |
| 6,480,103 B1 | 11/2002 | McCarthy et al. |

(56) References Cited

U.S. PATENT DOCUMENTS

| | | |
|---|---|---|
| 6,485,081 B1 | 11/2002 | Bingle et al. |
| 6,497,503 B1 | 12/2002 | Dassanayake et al. |
| 6,498,620 B2 | 12/2002 | Schofield et al. |
| 6,504,518 B1 | 1/2003 | Kuwayama et al. |
| 6,515,582 B1 | 2/2003 | Teowee et al. |
| 6,542,305 B2 | 4/2003 | Nakamura et al. |
| 6,578,871 B2 | 6/2003 | Gray et al. |
| 6,587,770 B1 | 7/2003 | Gray et al. |
| 6,657,789 B2 | 12/2003 | Nakamura et al. |
| 6,678,614 B2 | 1/2004 | McCarthy et al. |
| 6,690,268 B2 | 2/2004 | Schofield et al. |
| 6,753,780 B2 | 6/2004 | Li |
| 6,768,420 B2 | 7/2004 | McCarthy et al. |
| 6,783,167 B2 | 8/2004 | Bingle et al. |
| 6,806,452 B2 | 10/2004 | Bos et al. |
| 6,824,281 B2 | 11/2004 | Schofield et al. |
| 6,946,978 B2 | 9/2005 | Schofield |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,043,056 B2 | 5/2006 | Edwards et al. |
| 7,062,300 B1 | 6/2006 | Kim |
| 7,065,432 B2 | 6/2006 | Moisel et al. |
| 7,097,226 B2 | 8/2006 | Bingle et al. |
| 7,123,168 B2 | 10/2006 | Schofield |
| 7,167,796 B2 | 1/2007 | Taylor et al. |
| 7,227,611 B2 | 6/2007 | Hull et al. |
| 7,331,671 B2 | 2/2008 | Hammoud |
| 7,460,693 B2 | 12/2008 | Loy et al. |
| 7,526,103 B2 | 4/2009 | Schofield et al. |
| 7,572,008 B2 | 8/2009 | Elvesjo et al. |
| 7,639,149 B2 | 12/2009 | Katoh |
| 7,653,213 B2 | 1/2010 | Longhurst et al. |
| 7,720,580 B2 | 5/2010 | Higgins-Luthman |
| 7,855,755 B2 | 12/2010 | Weller et al. |
| 7,869,129 B2 | 1/2011 | Lebreton |
| 7,914,187 B2 | 3/2011 | Higgins-Luthman et al. |
| 8,066,375 B2 | 11/2011 | Skogo et al. |
| 8,120,577 B2 | 2/2012 | Bouvin et al. |
| 8,165,347 B2 | 4/2012 | Heinzmann et al. |
| 8,185,845 B2 | 5/2012 | Bjorklund et al. |
| 8,220,926 B2 | 7/2012 | Blixt et al. |
| 8,258,932 B2 | 9/2012 | Wahlstrom |
| 8,314,707 B2 | 11/2012 | Kobetski et al. |
| 8,339,446 B2 | 12/2012 | Blixt et al. |
| 8,342,687 B2 | 1/2013 | Blixt et al. |
| 8,482,535 B2 | 7/2013 | Pryor |
| 8,562,136 B2 | 10/2013 | Blixt et al. |
| 8,610,768 B2 | 12/2013 | Holmberg et al. |
| 2003/0021043 A1 | 1/2003 | Nakamura et al. |
| 2004/0114381 A1 | 6/2004 | Salmeen et al. |
| 2005/0024490 A1 | 2/2005 | Harada et al. |
| 2008/0088527 A1 | 4/2008 | Fujimori et al. |
| 2008/0285138 A1 | 11/2008 | Lebreton |
| 2009/0067057 A1* | 3/2009 | Sprague ............ G02B 27/0101 359/630 |
| 2009/0086329 A1 | 4/2009 | Potakowskyj et al. |
| 2009/0237803 A1* | 9/2009 | Hotta ................. G02B 3/005 359/630 |
| 2010/0253597 A1 | 10/2010 | Seder et al. |
| 2012/0176683 A1 | 7/2012 | Rumpf et al. |
| 2012/0188650 A1 | 7/2012 | Rumpf et al. |
| 2013/0127980 A1 | 5/2013 | Haddick et al. |
| 2013/0194426 A1 | 8/2013 | Schofield et al. |
| 2014/0098008 A1 | 4/2014 | Hatton |
| 2014/0139676 A1 | 5/2014 | Wierich |
| 2014/0207344 A1 | 7/2014 | Ihlenburg et al. |
| 2014/0218529 A1 | 8/2014 | Mahmoud |
| 2014/0333729 A1 | 11/2014 | Pflug |
| 2014/0336876 A1 | 11/2014 | Gieseke et al. |
| 2015/0022664 A1 | 1/2015 | Pflug |
| 2015/0112586 A1 | 4/2015 | Ihara et al. |
| 2015/0129343 A1 | 5/2015 | Teng et al. |
| 2015/0232030 A1 | 8/2015 | Bongwald |
| 2015/0294169 A1 | 10/2015 | Zhou |
| 2015/0296135 A1 | 10/2015 | Wacquant |

FOREIGN PATENT DOCUMENTS

| | | |
|---|---|---|
| DE | 9006007 | 6/1991 |
| DE | 102012203491 | 9/2013 |
| EP | 0235372 | 11/1986 |
| EP | 1550572 | 7/2005 |
| FR | 2693807 | 1/1994 |
| GB | 2252438 | 8/1992 |
| GB | 2246878 | 12/1992 |
| GB | 2266799 | 11/1993 |
| JP | 2005153723 | 6/2005 |
| JP | 2006036018 | 2/2006 |
| JP | 2007302195 | 11/2007 |
| JP | 2009515768 | 4/2009 |
| JP | 5779765 | 7/2015 |
| WO | WO 9739920 | 10/1997 |

OTHER PUBLICATIONS

Kircher et al., "Vehicle Control and Drowsiness", VTI meddelande 922A, Swedish National Road and Transport Research Institute, Feb. 2012.

Tobii Technology the World Leader in Eye Tracking and Gaze Interaction Company Article, Feb. 14, 2012.

EYETRACKING, INC., "EyeTracking, Inc. Timeline" Page, Website Screenshot, Feb. 2014.

SEEING MACHINES, INC., "Seeing Machines | Saves Lives" Page, Website Screenshot, Nov. 2014.

SECURAPLANE TECHNOLOGIES LLC, "Securaplane System 500" Product Information, Jan. 16, 2008.

Yarrow, "Eye-tracking technology—how your car will watch your every move for you", MSN Cars, Feb. 18, 2014.

WIKIPEDIA, "Driver Monitoring System" Website Screenshot, Dec. 11, 2010.

AUTOLIVE, SmartEye Website Screenshot, Oct. 22, 2014.

* cited by examiner

HEAD-UP DISPLAY AND VEHICLE USING THE SAME

TECHNICAL FIELD

The disclosure relates in general to an optical display device and a vehicle using the same, and in particular to a head-up display (HUD) and a vehicle using the same.

BACKGROUND

Today, head-up displays (HUDs) are commonly used in vehicles. Current HUDs can be categorized into two groups: windscreen HUD and combiner HUD. The former uses the windscreen of vehicle as a projection surface, while the later uses an additional combiner screen as the projection surface. The combiner screen HUDs are superior to the windscreen HUDs in means of over-all costs, and in addition, the combiner HUDs can be easily sold as aftermarket products in a one-box design.

However, the combiner HUD has the particular drawback of their smaller screen size of the projection surface. This may lead to a smaller text and symbol size or less information to be displayed on the combiner screens. Furthermore, the display of the combiner HUD usually cannot use its total surface for the projection because it must compensate for movements of the driver's head.

SUMMARY

The disclosure is directed to a head-up display (HUD) and a vehicle using the same, which are capable of increasing the usable area of the projection screen of the HUD.

According to one embodiment, a HUD is provided. The HUD comprises a detection unit, a picture generating unit and a control unit. The detection unit detects a position of an object and generates a detection signal indicated the position of the object. The picture generating unit comprises a screen and an optical unit. The screen displays a visual image. The optical unit projects the visual image onto the screen. The control unit is coupled to the detection unit and the picture generating unit, controlling the screen to facing toward the object in response to the detection signal.

According to another embodiment, a vehicle applying a HUD is provided. The HUD comprises a detection unit, a picture generating unit and a control unit. The detection unit detects a position of an object and generates a detection signal indicated the position of the object. The picture generating unit comprises a screen and an optical unit. The screen displays a visual image. The optical unit projects the visual image onto the screen. The control unit is coupled to the detection unit and the picture generating unit, controlling the screen to facing toward the object in response to the detection signal.

Figure 1:
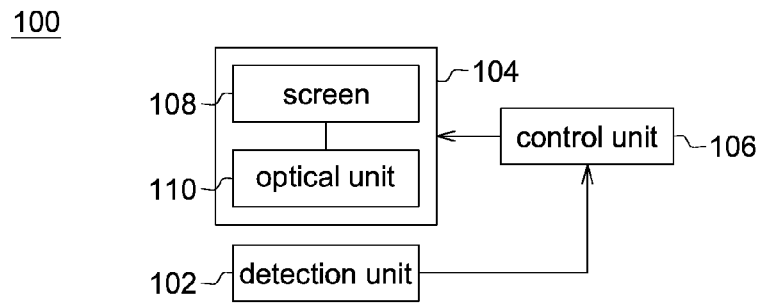
FIG. 1 shows a block diagram of a head-up display (HUD) according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 shows a block diagram of a head-up display (HUD) 100 according to an embodiment of the present disclosure. The HUD 100 comprises a detection unit 102, a picture generating unit 104 and a control unit 106.

The detection unit 102 is configured to detect an object and generate a detection signal which indicated the position of the object relative to the HUD 100. For example, the detection unit 102 may detect the driver's head/face in the vehicle from the perspective of the HUD 100 and generate a detection signal which indicated the position of the driver relative to the HUD 100 accordingly. The detection unit 102 can realized by a camera, an ultrasonic sensor, a radar, an infra-red (IR) based sensor or any other sensors can be used for performing such detection. The detection signal may be, for example, a digital representation of the detected object. The position of the driver's head/face relative to the HUD 102 can be identified and processed by the control unit 106 based on the detection signal. Details of the operation of the control unit 106 are further exemplified and described in the following detailed description.

The picture generating unit 104 comprises a screen 108 and an optical unit 110. The screen 108 is configured to display a visual image. The optical unit 110 is coupled to the screen 108 and configured to project the visual image onto the screen 108. In one embodiment, the visual image may include driving-relevant information such as navigation map, vehicle speed, the amount of remaining oil, over speed warning and etc. Thus, the driver can keep his/her eyes on the road while checking on the driving-relevant information provided by the HUD 100 thereby ensuring the safety and security.

The control unit 106 is coupled to the detection unit 102 and the picture generating unit 104, controlling the screen 108 to facing toward the object in response to the detection signal. In one embodiment, the control unit 106 is configured to control an angle of inclination and/or rotation of the picture generating unit 104 in response to the detection signal. For example, in response to the detection signal generated by the detection unit 102, the control unit 106 may control the angle of inclination and/or rotation of the picture generating unit 104 to adjust the screen 108 to face towards the object.

The angle of inclination and/or rotation of the picture generating unit 104 controlled by the control unit 106 can be determined by the position of the object. For example, after the detection unit 102 detects an object (e.g., the driver's head/face), the control unit 106 may determine the position of the object relative to the HUD 100 by such as performing face recognition and then control the angle of inclination and/or rotation of the picture generating unit 104 to adjust the screen 108 to face towards the position of the object. Accordingly, even the driver changes his/her position while driving, the movement of the driver can be compensated by adjusting the screen 108 to face towards the driver's head/face, and thus the usable area of the screen 108 of the HUD 100 can be increased.

Figure 2A:
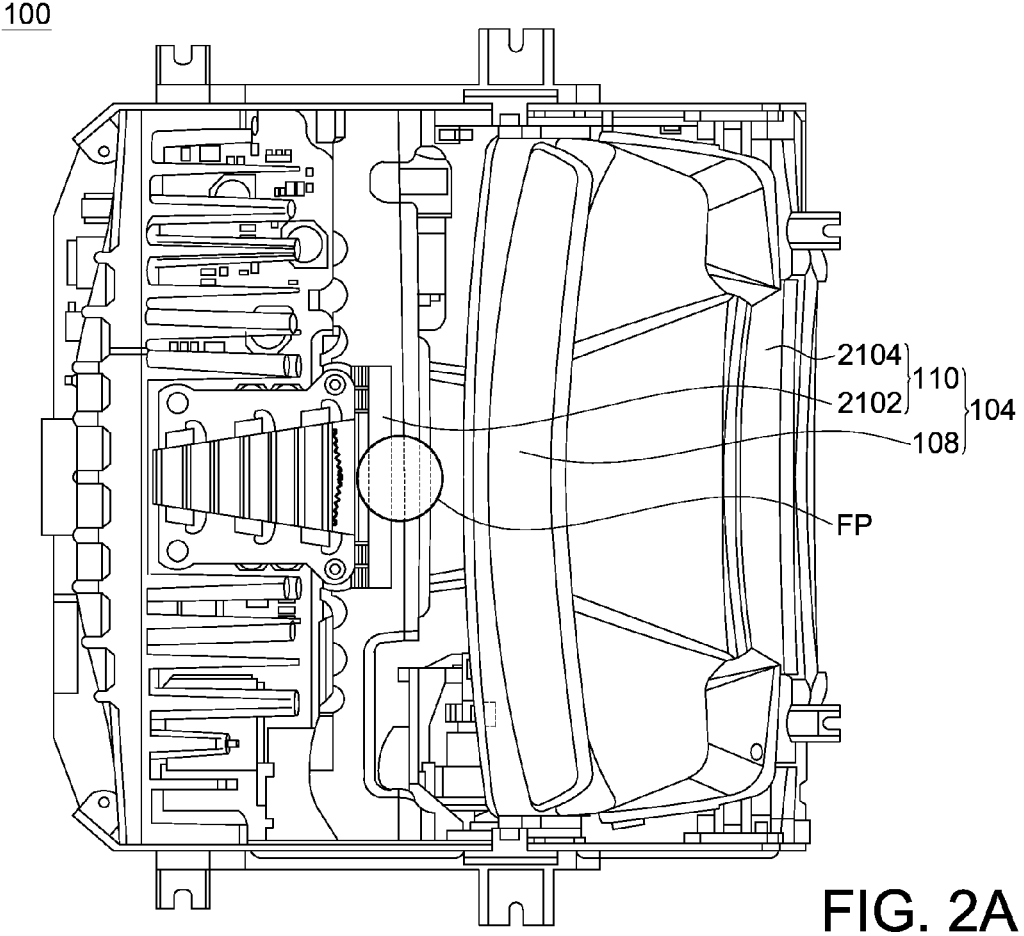
FIG. 2A shows a top view of a picture generating unit of a HUD according to an embodiment of the present disclosure.
Figure 2B:
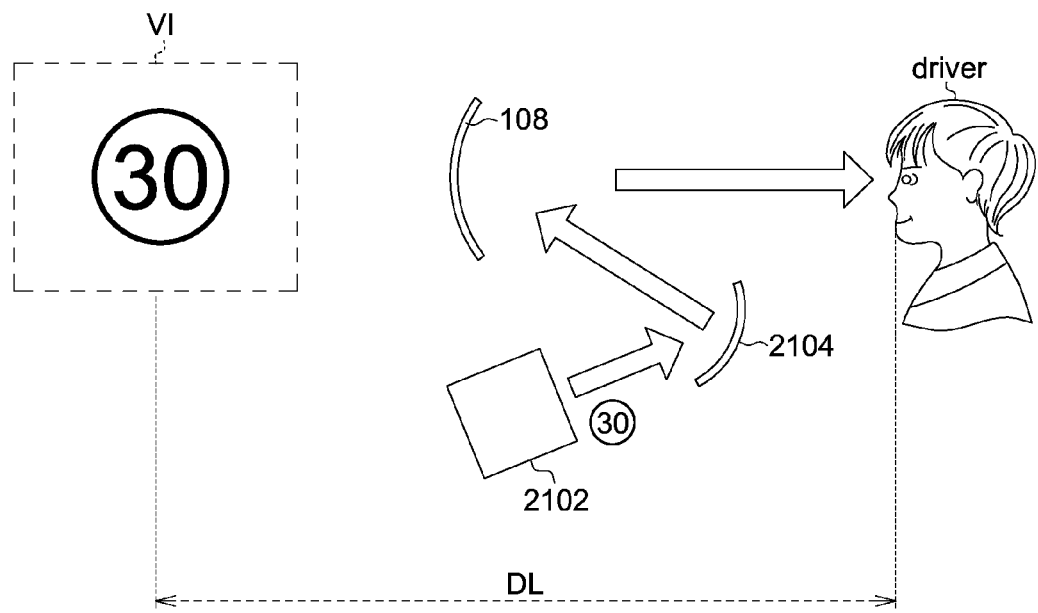
FIG. 2B shows a schematic diagram of the configuration of the picture generating unit according to an embodiment of the present disclosure.

Referring to FIG. 2A and FIG. 2B, FIG. 2A shows an exemplary top view of the HUD 100 according to an embodiment of the present disclosure, and FIG. 2B shows a schematic diagram of the configuration of the picture generating unit 104 of the HUD 100. In the embodiment, the optical unit 110 of the HUD 100 comprises a projector 2102 and a reflector 2104.

The projector 2102 is configured to project the visual image. In one embodiment, the projector 2102 can be a TFT display or other kinds of picture projecting source. The reflector 2104 is configured to guide the visual image from the projector 2102 to the screen 108 and thus the visual image can be projected onto the screen 108. In one embodiment, the reflector 2104 can be a mirror.

As shown in FIG. 2B, light projected by the projector 2102 is guided to the screen 108 through the reflector 2104 so that the driver can see the virtual image VI through the screen 108. In one embodiment, the distance (DL) between the driver and the virtual image VI is 190 mm. In one embodiment, the virtual image VI measures by 130 mm×40 mm.

Referring to FIG. 2A again, in one embodiment, the picture generating unit 104 can be controlled by the control unit 106 to rotate around a vertical axis. As shown in FIG. 2A, the HUD 100 further comprises a fulcrum (FP) used for rotating the picture generating unit 104 horizontally.

Figure 2C:
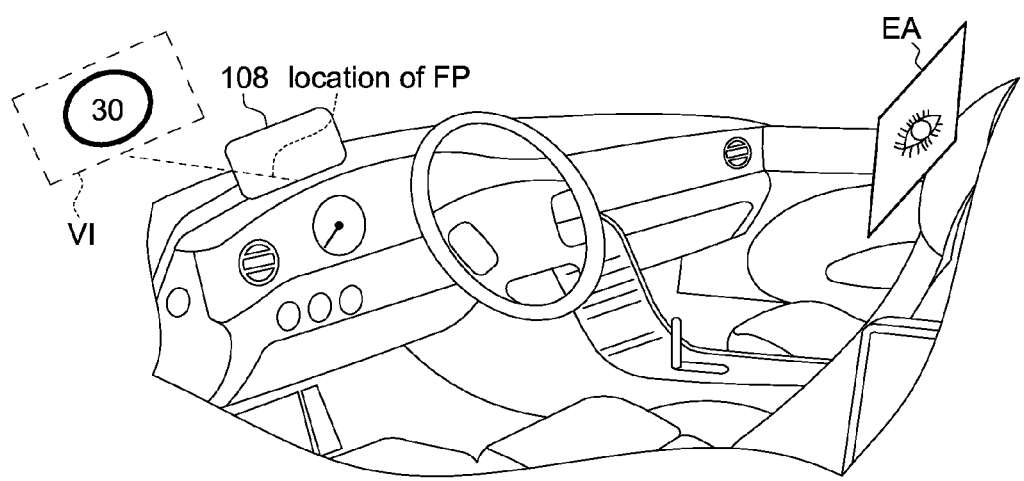
FIG. 2C shows the potential location for disposing the fulcrum of the HUD.

FIG. 2C shows the potential location for disposing the fulcrum (FP) of the HUD 100. In FIG. 2C, the box EA represents the position of the driver's eyes. The driver may see the virtual image VI through the screen 108. In the embodiment, the fulcrum (FP) is located along a line between the center of the screen 108 and the center of the visual image VI. However, the present disclosure is not limited thereto. The fulcrum (FP) can also be disposed at other positions of the HUD 100 according to various designs.

Figure 3:
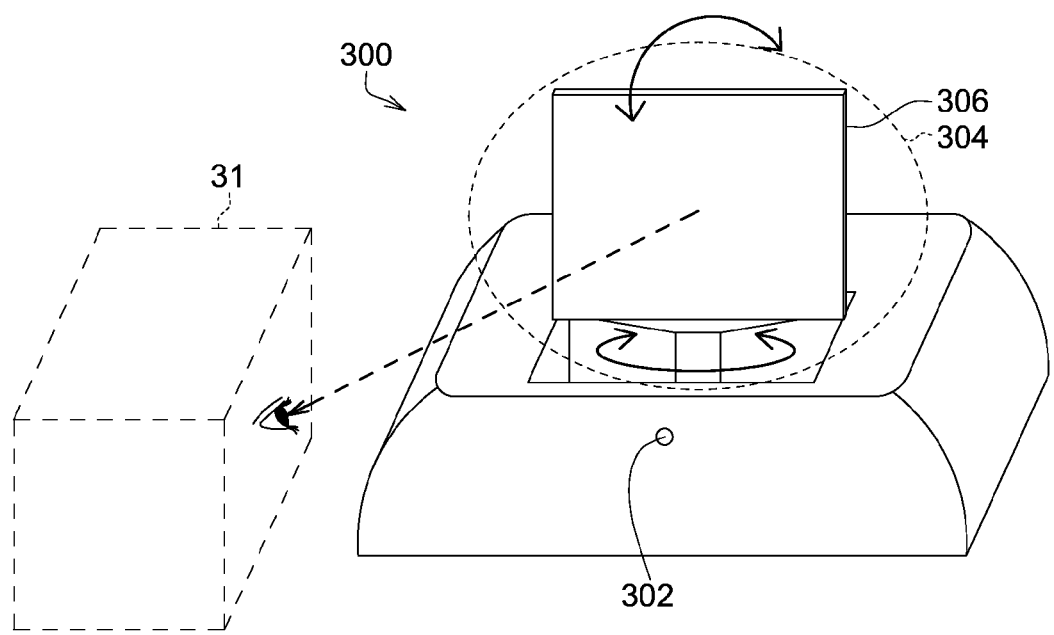
FIG. 3 shows a schematic diagram of a HUD according to an embodiment of the present disclosure.

FIG. 3 shows a schematic diagram of a HUD 300 according to an embodiment of the present disclosure. In the example of FIG. 3, the picture generating unit 304 is a movable part of the HUD 300 and can be rotated in at least two directions (a vertical direction and a horizontal direction). For example, in response to a detection signal generated by the detection unit 302, the control unit (not shown in FIG. 3) of the HUD 300 may control an angle of inclination and/or rotation of the picture generating unit 304 to adjust the screen 306 of the HUD 300 to face towards the object 31 (e.g., the driver's head/face).

Figure 4:
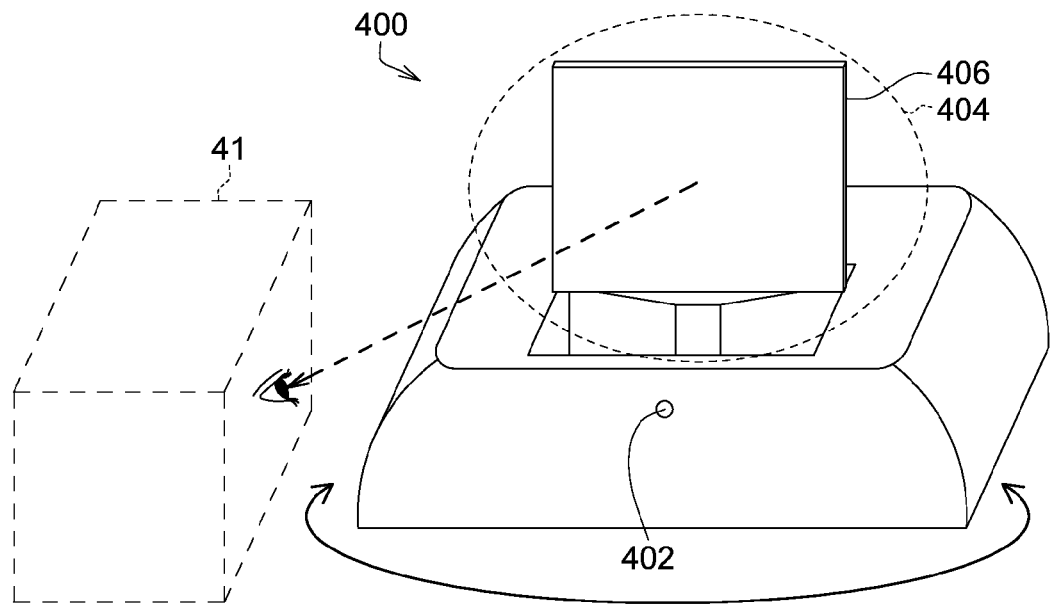
FIG. 4 shows a schematic diagram of a HUD according to an embodiment of the present disclosure.

FIG. 4 shows a schematic diagram of a HUD 400 according to an embodiment of the present disclosure. In the example of FIG. 4, the detection unit 402 captures a picture of an object 41 (e.g., the driver's head/face) and generates a detection signal accordingly. In response to the detection signal of the detection unit 402, the control unit (not shown in FIG. 4) of the HUD 400 may rotate the whole body of the HUD 400 so as to control the screen 406 of the HUD 400 facing towards the object 41. In other words, compared to the embodiment shown in FIG. 3, the HUD 400 of the embodiment shown in FIG. 4 can be rotated horizontally in response to the detection signal so that the screen 406 of the HUD 400 can maintain facing towards the object 41 even though the object 41 changes its position.

Figure 5:
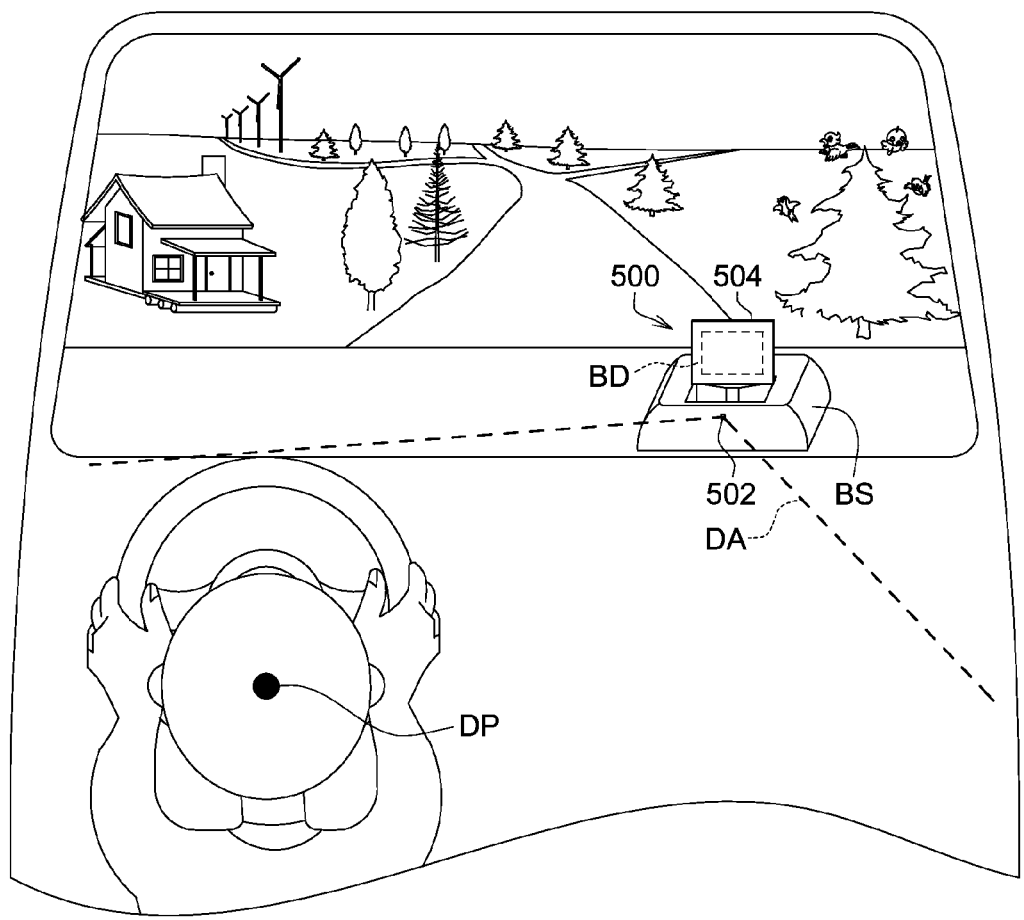
FIG. 5 shows a schematic diagram of a vehicle installing a HUD.

FIG. 5 shows a schematic diagram of a vehicle 51 applying a HUD 500. In the example of FIG. 5, the coverage of a detection area (DA) of the detection unit 502 covers a driver's position (DP). The detection unit 502 may detect the driver's head/face and then generate a detection signal. In response to the detection signal generated by the detection unit 502, the control unit (not shown in FIG. 5) of the HUD 500 may determine the driver's position (DP) relative to the HUD 500 by such as performing face recognition.

The detection unit 502 of the HUD 500 can be located at any position inside the vehicle 51 from which it can detect the position of the driver's eyes. In one embodiment, the detection unit 502 is installed in a position that allows the coverage of the detection area (DA) to cover the driver's position (DP) in the vehicle 51. As shown in FIG. 5, the detection unit 502 is installed in the base (BS) of the HUD 500 that faces towards the driver. In another example, the detection unit 502 can be installed at the border (BD) of the screen 504 of the HUD 500 (if existing) as long as the detection unit 502 can detect the position of the driver's eyes.

Figure 6A:
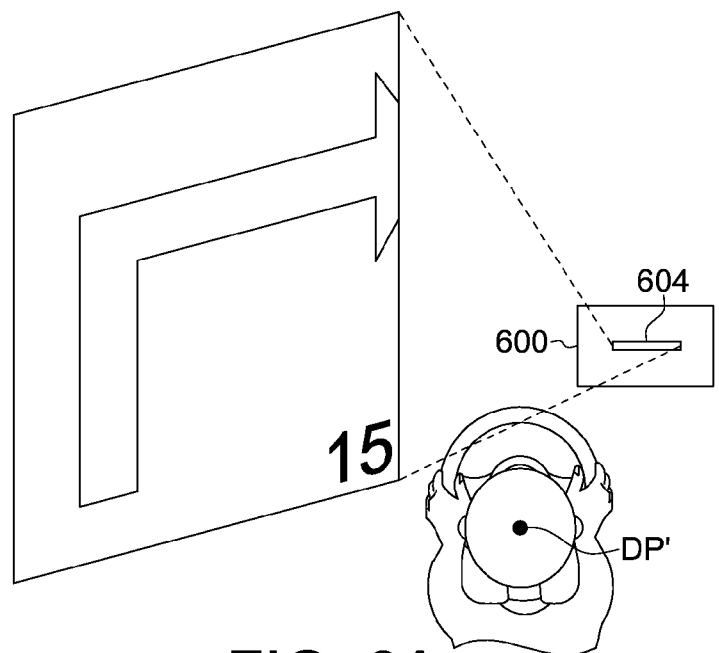
FIG. 6A shows an exemplary picture displayed on a screen of a HUD in a view from a driver's position.

FIG. 6A shows an exemplary picture displayed on a screen 604 of a HUD 600 in a view from a driver's position (DP'). In the example of FIG. 6A, some navigation information can not be seen by the driver when the screen 604 does not face towards the driver because the viewable area of screen 604 is limited by the viewing angle of the driver.

Figure 6B:
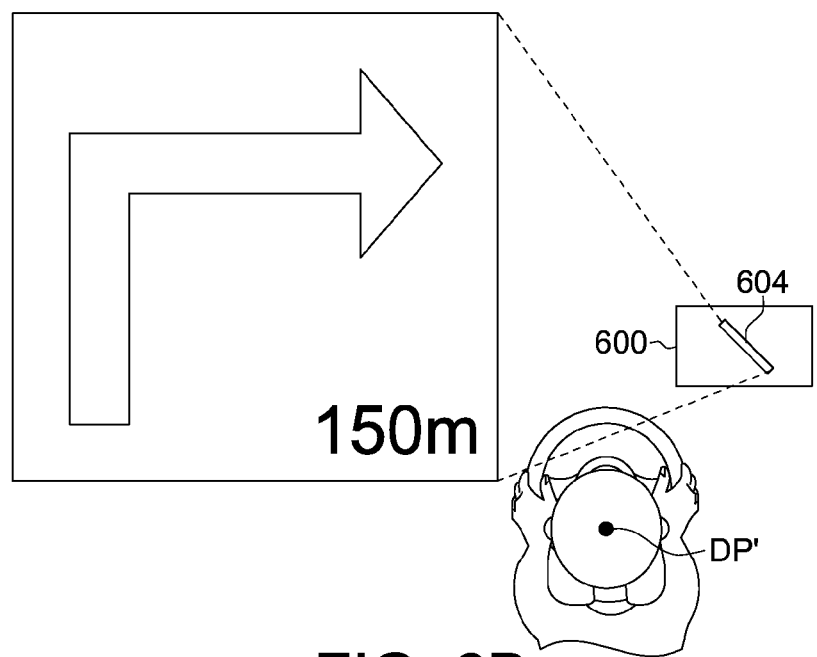
FIG. 6B shows an exemplary picture displayed on a screen of a HUD in a view from a driver's position.

When the HUD 600 finds that the screen 604 does not face towards the driver, the HUD 600 may perform the above mentioned adjustment operations to adjust the screen 604 to face towards the driver. After the screen 604 is adjusted to face towards the driver, the viewable area of screen 604 is maximized and the loss of navigation information is avoided, as shown in FIG. 6B.

According to the above, the HUD of the present disclosure may control its screen facing towards the driver. Accordingly, part of the area of screen reserved for compensating the movement of the driver can be reduced or omitted, and thus the usable area of the screen of the HUD can be increased.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A head-up display (HUD), comprising:
   a detection unit for detecting a position of an object and generating a detection signal that indicates the position of the object, the object comprising at least a portion of a head of a person within a vehicle;
   a picture generating unit comprising:
      a screen configured to be spaced from a vehicle windshield for displaying a visual image so that the displayed visual image on the screen is viewable by the person within the vehicle; and
      an optical unit coupled to the screen, the optical unit projecting the visual image onto the screen; and
   a control unit coupled to the detection unit and the picture generating unit, the control unit, responsive to the detection signal, controlling a position of the screen relative to the vehicle windshield to adjust the screen so that the screen is facing generally toward the object to enhance viewing of the displayed visual image at the screen by the person within the vehicle.

2. The HUD of claim 1, wherein the control unit performs face recognition to determine the position of the object relative to the HUD.

3. The HUD of claim 1, wherein the optical unit comprises:
a projector for projecting the visual image; and
a reflector for guiding the visual image from the projector to the screen.

4. The HUD according to claim 3, wherein the control unit rotates the picture generating unit around a fulcrum, and the fulcrum is located along a line between the center of the screen and the center of the visual image.

5. The HUD of claim 1, wherein the control unit rotates the body of the HUD to control the screen facing towards the object.

6. The HUD of claim 1, wherein the coverage of a detection area of the detection unit covers a driver's position.

7. The HUD of claim 1, wherein the detection unit is installed in a base of the HUD.

8. The HUD of claim 1, wherein the detection unit is installed in a border of the screen.

9. A vehicle applying a head-up display (HUD), wherein the HUD comprises:
a detection unit for detecting a position of an object and generating a detection signal that indicates the position of the object, the object comprising at least a portion of a head of a person within the vehicle;
a picture generating unit comprising:
a screen spaced from a windshield of the vehicle for displaying a visual image so that the displayed visual image on the screen is viewable by the person within the vehicle; and
an optical unit coupled to the screen, the optical unit projecting the visual image onto the screen; and
a control unit coupled to the detection unit and the picture generating unit, the control unit, responsive to the detection signal, controlling a position of the screen relative to the vehicle windshield to adjust the screen facing generally toward the object to enhance viewing of the displayed visual image at the screen by the person within the vehicle.

10. The vehicle of claim 9, wherein the control unit performs face recognition to determine the position of the object relative to the HUD.

11. The vehicle of claim 9, wherein the optical unit comprises:
a projector for projecting the visual image; and
a reflector for guiding the visual image from the projector to the screen.

12. The vehicle according to claim 11, wherein the control unit rotates the picture generating unit around a fulcrum, and the fulcrum is located along a line between the center of the screen and the center of the visual image.

13. The vehicle of claim 9, wherein the control unit rotates the body of the HUD to control the screen facing towards the object.

14. The vehicle of claim 9, wherein the coverage of a detection area of the detection unit covers a driver's position.

15. The vehicle of claim 9, wherein the detection unit is installed in a base of the HUD.

16. The vehicle of claim 9, wherein the detection unit is installed in a border of the screen.

\* \* \* \* \*